United States Patent
Kundermann et al.

(10) Patent No.: US 6,622,839 B2
(45) Date of Patent: Sep. 23, 2003

(54) MULTIPLE CLUTCH ARRANGEMENT

(75) Inventors: Wolfgang Kundermann, Schweinfurt (DE); Jörg Sudau, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/903,182

(22) Filed: Jul. 11, 2001

(65) Prior Publication Data

US 2002/0007997 A1 Jan. 24, 2002

(30) Foreign Application Priority Data

Jul. 17, 2000 (DE) .......................................... 100 34 677

(51) Int. Cl.⁷ .............................. F16D 13/52; F16D 3/12
(52) U.S. Cl. ..................... 192/48.9; 74/449; 192/55.51; 192/70.17; 192/87.15; 192/207
(58) Field of Search ................................ 192/48.8, 48.9, 192/55.51, 207, 87.15, 70.17; 74/443, 449, 433

(56) References Cited

U.S. PATENT DOCUMENTS

| | | | | |
|---|---|---|---|---|
| 2,141,014 A | * | 12/1938 | Nutt .......................... 192/207 |
| 2,207,290 A | * | 7/1940 | Hale ........................... 74/443 |
| 2,407,757 A | * | 9/1946 | MacCallum ................ 192/200 |
| 2,620,685 A | * | 12/1952 | Smirl ........................ 192/87.15 |
| 3,387,505 A | * | 6/1968 | Rumsey ....................... 74/574 |
| 3,759,066 A | * | 9/1973 | Portnoy .................. 192/107 R |
| 4,044,628 A | * | 8/1977 | Jacks .......................... 188/268 |
| 4,667,796 A | * | 5/1987 | Uchibaba .............. 192/107 M |
| 4,795,012 A | * | 1/1989 | Durum ....................... 192/207 |
| 5,147,246 A | * | 9/1992 | Focqueur et al. ........... 192/207 |
| 5,797,474 A | * | 8/1998 | Nakane et al. .............. 192/207 |
| 5,887,690 A | * | 3/1999 | Haupt ..................... 192/87.15 |
| 5,908,095 A | | 6/1999 | Jäckel et al. ............. 192/70.17 |
| 5,966,989 A | * | 10/1999 | Reed et al. .................... 74/331 |
| 6,012,561 A | | 1/2000 | Reed, Jr. et al. ........... 192/48.2 |

FOREIGN PATENT DOCUMENTS

| | | | |
|---|---|---|---|
| DE | 23 14 006 B2 | 10/1974 | ......... F16D/21/06 |
| DE | 44 15 664 | 11/1995 | ......... F16D/13/52 |
| DE | 100 34 730 A1 | 8/2001 | ......... F16D/21/06 |
| EP | 0 294 130 A2 | 12/1988 | ......... F16F/15/12 |
| JP | 59-034026 | 2/1984 | ......... F16D/13/00 |
| JP | 63-186037 | 8/1988 | ......... F16D/13/52 |

* cited by examiner

Primary Examiner—Rodney H. Bonck
(74) Attorney, Agent, or Firm—Cohen, Pontani, Lieberman & Pavane

(57) ABSTRACT

A multiple clutch arrangement includes a drive member, first and second output members, a first clutch arrangement for selective activation of a first torque transmission path between the drive member and the first output member, and a second clutch arrangement for selective activation of a second torque transmission path between the drive member and the second output member. A torsional vibration damper arrangement is arranged in at least one of the first and second clutch arrangements in the associated torque transmission path.

14 Claims, 5 Drawing Sheets

MULTIPLE CLUTCH ARRANGEMENT

BACKGROUND OF THE INVENTION

1. Field of the Invention

The present invention relates to a multiple clutch arrangement including a first clutch region for selective activation of a first torque transmission path in the multiple clutch arrangement between a drive member and a first output member and a second clutch region for selective activation of a second torque transmission path in the multiple clutch arrangement between the drive member and a second output member.

2. Description of the Related Art

German reference DE 44 15 664 A1 discloses a multiple clutch arrangement in which a torque transmission path may be produced between a drive member and one of a plurality of output members by selective activation of one multidisk clutch arrangement of a plurality of multidisk clutch arrangements. In multiple clutch arrangements of this type, the output members are generally formed by shafts, for example transmission input shafts, which are coaxially interleaved with one another and of relatively long design. Because of their long lengths, these transmission input shafts have relatively low torsional rigidities and therefore act as torsion springs integrated in the drive train. This additional elasticity often leads to undesirable shifts of the resonant vibration range of a drive train of this nature. To counteract this, torsional vibration dampers may be integrated in this type of drive train ahead of the transmission, i.e. ahead of the individual torque transmission paths which are integrated into the transmission. The torsional vibration damper is of known design and may, for example, be in the form of a multimass flywheel. However, a torsional vibration damper of this type requires additional space and creates additional costs to a system of this type. Another problem associated with these torsional vibration dampers is that the integration of a torsional vibration damper of this type at a connection point ahead of the transmission shifts the location of the natural frequencies in the region of the transmission input shaft toward a higher torque range. In this torque range, however, a pre-connected torsional vibration damper of this type often cannot contribute to vibration damping to the required extent. Furthermore, to avoid vibration excitation, it is known to operate the various clutch regions in slipping mode at least in certain torque ranges. However, in addition to the energy loss which occurs, this also causes excessive wear to the surfaces which bear frictionally against one another.

SUMMARY OF THE INVENTION

The object of the present invention is to provide a multiple clutch arrangement with structurally simple means which require little space and ensure sufficient vibration damping of vibration excitation which occurs in rotation.

According to the present invention, the object is met by a multiple clutch arrangement including a first clutch region for selective activation of a first torque transmission path in the multiple clutch arrangement between a drive member and a first output member and a second clutch region for selective activation of a second torque transmission path in the multiple clutch arrangement between the drive member and a second output member.

Furthermore, at least one of the clutch regions includes a torsional vibration damper arrangement arranged in the associated torque transmission path in the multiple clutch arrangement.

The integration of the torsional vibration damper arrangement into at least one of the torque transmission paths provided within the multiple clutch arrangement obviates the requirement for a torsion vibration damper which otherwise has to be provided separately outside the multiple clutch arrangement. In addition to this advantage which allows a significantly smaller overall size, the invention also allows a special damper which is attuned to the occurring vibration excitation to be provided for the specific torque transmission path. This damps the vibrations which occur in rotary mode with a significantly smaller overall size and also allows for separate tuning to the specific natural frequencies which occur for each vibration path. This is particularly important because the different torque transmission paths of multiple clutch arrangements of this type are in each case used for different gears and therefore also in different natural frequency ranges.

In the multiple clutch arrangement according to the present invention, one torsional vibration damper arrangement may be assigned to each of the first and second clutch regions. In this case, for vibration reasons, it is also preferable if the torsional vibration damper arrangement assigned to at least one clutch region is arranged—with respect to a torque flux direction from the drive member to the associated output member—in the output-side region of the at least one clutch region.

When a multiple clutch arrangement according to the present invention is to transmit relatively high loads, the at least one clutch region comprises a multidisk clutch arrangement including at least one drive disk which is or may be fixedly coupled to the drive member for common rotation therewith and at least one output disk which is or can be fixedly coupled to the associated output member for common rotation therewith. In this embodiment, the torsional vibration damper arrangement assigned to the at least one clutch region is arranged in a disk-carrier region of the multidisk arrangement. In this case, the torsional vibration damper arrangement may be provided in an output disk-carrier region for reasons of space.

In the multiple clutch arrangement according to the present invention, the disk-carrier region may include a disk-carrying section for carrying the at least one disk and a connecting section connected to the disk-carrying section in a substantially rotationally fixed manner. In this embodiment, the torsional vibration damper arrangement may be integrated into the connecting section.

To integrate the torsional vibration damper in the torque transmission path of the clutch with a configuration which takes up as little space as possible, i.e. takes up preferably no more space than a conventional arrangement, the torsional vibration damper arrangement includes at least one damper element, wherein the at least one damper element has a radially outer coupling region, a radially inner coupling region, and at least one deformation region extending between the radially outer coupling region and the radially inner coupling region. The deformation region is deformable to allow a relative circumferential movement between the radially outer coupling region and the radially inner coupling region.

Furthermore, the at least one deformation region may extend, at least in regions, with a circumferential-extent direction component between the radially outer coupling region and the radially inner coupling region. To obtain sufficient elasticity, the at least one deformation region may extend helically, at least in regions, with respect to an axis of rotation.

For reasons of symmetry and to increase the torque transmission capacity, the at least one damper element may include at least two deformation regions. Furthermore, the radially outer coupling region and/or the radially inner coupling region of the at least one damping element comprises a substantially annular design.

To keep the design of the multiple clutch arrangement according to the invention as simple as possible, the radially outer coupling region is formed integrally with the disk-carrying section. In particular, the torsional vibration damper arrangement may include the disk-carrying region. In an alternative embodiment, the radially outer coupling region is formed separately from the disk-carrying section and coupled to the disk-carrying section in a rotationally fixed manner. A desired vibration damping performance may be established, for example, by combining a plurality of damper elements.

In a further embodiment of the present invention, the radially outer coupling region, the radially inner coupling region and the at least one connecting region may be formed as an integral unit.

To integrate a respective torsional vibration damper arrangement into a torque transmission path, the torsional vibration damper arrangement may be formed by stamping and, if appropriate, forming of a sheet-metal part.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
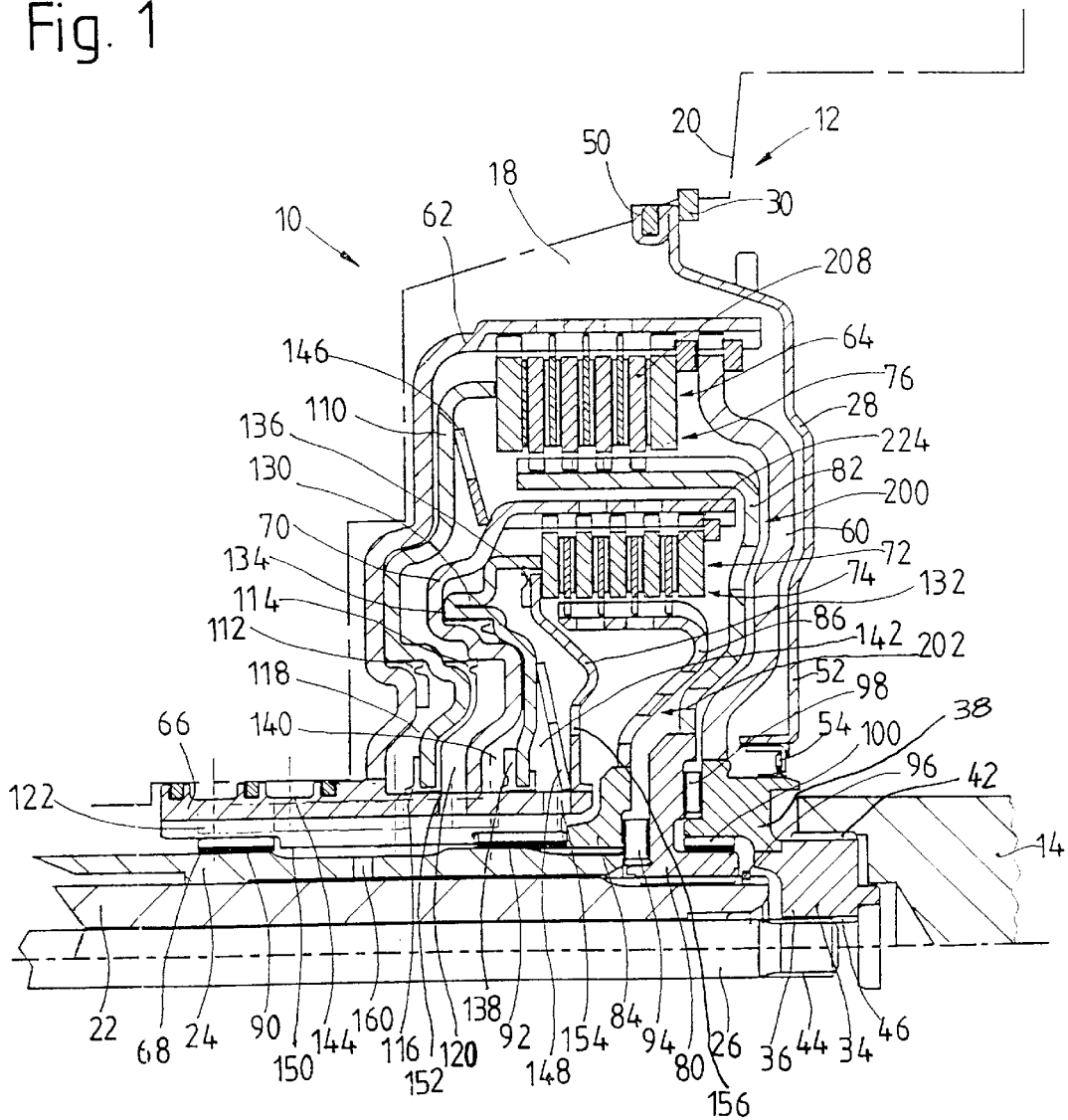
FIG. 1 is a partial longitudinal sectional view of a multiple clutch arrangement according to an embodiment of the present invention.

A dual clutch 12 arranged in a drive train 10 between a drive unit and a transmission according to an embodiment of the present invention is shown in FIG. 1. Regarding the drive unit, for example an internal combustion engine, only an output shaft 14 (which may also be referred to as a crankshaft 14, as appropate) of the drive unit is illustrated in FIG. 1. The transmission is represented schematically by a transmission casing section 20 which delimits a transmission casing bell 18. Two transmission input shafts 22 and 24, which are both designed as hollow shafts, are also shown. The transmission input shaft 22 extends substantially coaxially through the transmission input shaft 24. A pump drive shaft 26 is arranged in the interior of the transmission input shaft 22 which drives a transmission-side oil pump (not shown in FIG. 1), as explained in more detail below.

The dual clutch 12 is accommodated in the transmission casing bell 18. The interior of the transmission casing bell 18 is closed off in the direction of the drive unit by a cover 28 which is pressed into a bell casing opening and/or is secured therein by a circlip 30. If, as in the exemplary embodiment shown in FIG. 1, the dual clutch has wet-running friction clutches, it is generally appropriate to ensure a sealed engagement between the cover 28 and the clutch housing formed by the transmission casing bell 18. The seal may, for example, an O-ring or other sealing ring.

The dual clutch 12 includes a clutch hub 34 having two ring sections 36, 38 fixed to one another. The clutch hub 34 is arranged on the input side of the dual clutch 12. The clutch hub 34 extends through a central opening in the cover 28 toward the drive unit and is coupled to the crankshaft 14 or a torque transmission member attached thereto via an external toothing 42. An end of the pump drive shaft 26 which is remote from the transmission has external toothing 44 which engages in internal toothing 46 of the ring section 36 of the clutch hub 34, so that the pump drive shaft 26 rotates with the clutch hub 34 and accordingly drives the oil pump when a rotary movement is imparted to the clutch hub 34, generally from the drive unit, and in some operating situations possibly also from the transmission, via the dual clutch.

The cover 28 extends radially between an annular circumferential wall section of the casing bell 18, which delimits a radial recess 50 in the casing bell 18, and the ring section 38 of the hub 34. A sealing and/or rotary bearing arrangement 54 is preferably provided between a radially inner wall region 52 of the cover 28 and the clutch hub 34, i.e., the ring section 38. The bearing arrangement 54 is particularly useful if the cover 28 is fixed to the casing bell 18 and accordingly does not rotate with the dual clutch 12. A seal between the cover 28 and the clutch hub 34 is required when, as in the exemplary embodiment, the clutch regions of the dual clutch are wet-running clutches. A high degree of operational reliability may be achieved even in the event of vibrations and oscillations if the sealing and/or rotary bearing arrangement 54 is secured axially to the cover 28 and/or to the clutch hub 34.

A metal carrier sheet 60 is arranged so that it is fixed with respect to rotation relative to the ring section 38 of the clutch hub 34 for transmitting torque between the clutch hub 34 and an outer disk carrier 62 of a first multidisk clutch arrangement 64. The outer disk carrier 62 extends toward the transmission and radially inward toward a ring part 66 on which the outer disk carrier is arranged in a rotationally fixed manner. The ring part 66 is mounted on the two transmission input shafts 22 and 24 by an axial and radial bearing arrangement 68 such that both radial and axial forces are supported on the transmission input shafts 22, 24. The axial and radial bearing arrangement 68 allows relative rotation between the ring part 66 and both the transmission input shaft 22 and the transmission input shaft 24.

Further toward the drive unit, an outer disk carrier 70 of a second multidisk clutch arrangement 72 is arranged in a rotationally fixed manner on the ring part 66. The disk assembly 74 of the second multidisk clutch arrangement 72 is surrounded annularly by the disk assembly 76 of the first multidisk clutch arrangement 64. As has already been pointed out, the two outer disk carriers 62 and 70 are connected to one another in a rotationally fixed manner via the ring part 66. Accordingly, the two outer disk carriers 62, 70 are in torque-transmitting connection to the clutch hub 34 and therefore to the crankshaft 14 of the drive unit via the metal carrier sheet 60. The outer disk carrier 62 is in positively locking torque-transmitting engagement with the outer disk carrier 62 via an outer toothing. Based on the normal torque flux from the drive unit to the transmission, the outer disk carriers 62 and 70 respectively serve as the input side of the first and second multidisk clutch arrangements 64 and 72.

A hub part 80 of an inner disk carrier 82 of the first multidisk clutch arrangement 64 is arranged in a rotationally fixed manner on the transmission input shaft 22 by a keyway toothing or the like. Correspondingly, a hub part 84 of an inner disk carrier 86 of the second multidisk clutch arrangement 72 is arranged in a rotationally fixed manner on the radially outer transmission input shaft 24 by a keyway toothing or the like. Based on the standard torque flux of the drive unit toward the transmission, the inner disk carriers 82 and 86 respectively serve as the output side of the first and second multidisk clutch arrangements 64 and 72.

The radial and axial bearing arrangement 68 of the ring part 66 on the transmission input shafts 22 and 24 includes two radial bearing assemblies 90 and 92 which are active between the radially outer transmission input shaft 24 and the ring part 66 and are used for radial bearing of the ring part 66. The axial bearing of the ring part 66 is effected, with respect to support in the direction toward the drive unit, via the hub part 84, an axial bearing 94, the hub part 80 and a circlip 96 which secures the hub part 80 in the axial direction on the radially inner transmission input shaft 22. The ring section 38 of the clutch hub 34 is mounted relative to the hub part 80 via an axial bearing 98 and a radial bearing 100. In the direction toward the transmission, the hub part 80 is supported in the axial direction on an end section of the radially outer transmission input shaft 24 via the axial bearing 94. The hub part 84 may be axially supported in the direction toward the transmission directly on an annular stop or the like or a separate circlip or the like arranged on the transmission input shaft 24. Since the hub part 84 and the ring part 66 are rotatable relative to one another, an axial bearing may optionally be provided between these components, provided that the bearing 92 does not act as both an axial bearing and a radial bearing. The exemplary embodiment of FIG. 1 assumes this latter situation.

In the exemplary embodiment of FIG. 1, those sections of the outer disk carriers 62 and 70 of the first and second multidisk clutch arrangements 64, 72 which extend in the radial direction are arranged on one axial side of a radial plane extending to an axis A of the dual clutch 12 and those sections of the inner disk carriers 82 and 86 of the first and second multidisk clutch arrangements 64, 72 which extend in the radial direction are arranged on the other axial side of this radial plane. This arrangement allows a particularly compact structure, in particular if disk carriers of one type (i.e., the outer disk carriers 62, 70 or the inner disk carriers 82, 86) are connected to one another in a rotationally fixed manner and each serve as the input side of the corresponding one of the first and second multidisk clutch arrangements 64, 72 with respect to the flux of force from the drive unit to the transmission. In the present embodiment, the outer disk carriers 62, 70 are connected in a rotationally fixed manner.

Actuating pistons for actuating the first and second multidisk clutch arrangements 64, 72, and in the case of the exemplary embodiment shown for actuating the multidisk clutch arrangements for the purpose of clutch engagement, are integrated into the dual clutch 12. An actuating piston 110 assigned to the first multidisk clutch arrangement 64 is arranged axially between the radially extending section of the outer disk carrier 62 of the first multidisk clutch arrangement 64 and the radially extending section of the outer disk carrier 70 of the second multidisk clutch arrangement 72. The actuating piston 110 is displacable in the axial direction and guided in a sealed manner on both outer disk carriers and on the ring part 66 via seals 112, 114, 116. The seals 114, 116 may be formed from a single part. A pressure chamber 118 formed between the outer disk carrier 62 and the actuating piston 10 and a centrifugal force pressure-compensating chamber 120 formed between the actuating piston 110 and the outer disk carrier 70 are guided in a sealed manner. The pressure chamber 118 is in communication with a pressure-control device via a pressure-medium channel 122 formed in the ring part 66. The pressure-control device may, if appropriate, comprise a control valve connected to a pressure-medium supply, i.e., the above-mentioned oil pump, the pressure-medium channel 122 being connected to the pressure-control device via a connection sleeve which accommodates the ring part 66 and may be fixed to the transmission. In this context, it should be mentioned, with regard to the ring part 66, that to simplify production, in particular with regard to the pressure-medium channel 122 and a further pressure-medium channel, the ring part may be produced in two parts, with two sleeve-like ring-part sections which are fitted into one another, as indicated in FIG. 1.

An actuating piston 130 assigned to the second multidisk clutch arrangement 72 is arranged axially between the outer disk carrier 70 of the second multidisk clutch arrangement 72 and a wall part 132 which extends substantially radially and is fitted in a rotationally fixed and fluid-tight manner to an axial end region of the ring part 66, remote from the transmission. The actuating piston 130 is axially displaceable via seals 134, 136 and 138 on the outer disk carrier 70, the wall part 132 and the ring part 66. A pressure chamber 140, which is formed between the outer disk carrier 70 and the actuating piston 130, as well as a centrifugal force pressure-compensation chamber 142, which is formed between the actuating piston 130 and the wall part 132, are guided in a sealed manner. The pressure chamber 140 is connected to the pressure-control device via a further pressure-medium channel 144 in the ring part 66, similar to the way that the pressure chamber 118 is connected via pressure-medium channel 122. The pressure-control device (or devices) selectively applies a pressure supplied by the pressure-medium source to the two pressure chambers 118 and 140 to actuate the first multidisk clutch arrangement 64 and/or the second multidisk clutch arrangement 72 for the purpose of clutch engagement. Diaphragm springs 146, 148 are used for restoring movements, i.e., release movements of the clutch. The diaphragm spring 148 is assigned to the actuating piston 130 and is accommodated in the centrifugal force pressure-compensation chamber 142. The diaphragm spring 146 is assigned to the actuating piston 110 and is accommodated between the actuating piston 110 and the outer disk carrier 70.

Each of the pressure chambers 118 and 140 are completely filled with pressure medium (in this case hydraulic oil) during normal operating states of the dual clutch 112. The actuating state of the multidisk clutch arrangements is dependent on the pressure-medium pressure applied to the pressure chambers 118, 140. Since, the outer disk carriers 62 and 70, together with the ring part 66 and the actuating piston 110 and 130, as well as the wall part 132, rotate with the drive unit output shaft 14 in driving mode, pressure increases caused by centrifugal forces occur in the pressure chambers 118 and 140 without pressure being applied to these pressure chambers from the pressure-control device. At relatively high torques, these pressure increases may cause undesired engagement or at least rubbing of the multidisk clutch arrangements. For this reason, the above-mentioned centrifugal force pressure-compensation chambers 120, 142 are provided, which chambers accommodate a pressure-compensation medium and in which chambers there occur, in a corresponding way, pressure increases which are caused by centrifugal forces and compensate for the pressure increases caused by centrifugal forces which occur in the pressure chambers.

Consideration could be given to filling the centrifugal force pressure-compensation chambers 120 and 142 permanently with pressure-compensation medium, for example oil, in which case, if appropriate, volume compensation could be provided to accommodate pressure-compensation medium which is displaced during actuation of the actuating pistons. In the embodiment shown in FIG. 1, the centrifugal force pressure-compensation chambers 120, 142 are first filled with pressure-compensation medium while the drive train is operating. The pressure-compensation medium may comprise a supply of cooling fluid (cooling oil in the exemplary embodiment shown). The filling of the centrifugal force pressure-compensation chambers 120, 142 occurs via a connection to the multidisk clutch arrangements 64 and 72 via an annular channel 150, which is formed between the ring part 66 and the outer transmission input shaft 24 and which is understood to include the bearings 90, 92 which are permeable to the cooling oil. The cooling oil flows from a transmission-side connection between the ring part 66 and the transmission input shaft 24 toward the drive unit, through the bearing 90 and the bearing 92, and then flows in a partial flow between that end section of the ring part 66 which is remote from the transmission and the hub part 84, radially outward toward the disk assembly 74 of the second multidisk clutch arrangement 72. On account of passage openings in the inner disk carrier 86, the cooling oil enters the region of the disks, flows radially outward between the disks of the disk assembly 74 or through friction-lining grooves or the like of these disks, enters the region of the disk assembly 76 of the first multidisk clutch arrangement 64 through passage openings in the outer disk carrier 70 and passage openings in the inner disk carrier 82, flows radially outward between the disks of this disk assembly or through lining grooves or the like of these disks, and then finally flows radially outward through passage openings in the outer disk carrier 62. The centrifugal force pressure-compensation chambers 120, 142 are connected to the cooling-oil supply flow between the ring part 66 and the transmission input shaft 24 by radial bores 152, 154 in the ring part 66. Since, when the drive unit is stationary, the cooling oil which serves as pressure-compensation medium in the pressure-compensation chambers 120, 142 flows out of the pressure-compensation chambers on account of the lack of centrifugal forces, the pressure-compensation chambers are in each case refilled during operation of the drive train (of the motor vehicle).

Since a pressure-application surface of the actuating piston 130 which is assigned to the pressure chamber 140 is smaller and, moreover, does not extend as far outward in the radial direction as a pressure-application surface of the piston 130 which is assigned to the pressure-compensation chamber 142, at least one level-limiting opening 156, which sets a maximum radial filling level of the pressure-compensation chamber 142 producing the required centrifugal force compensation, is formed in the wall part 132. When the maximum filling level has been reached, the cooling oil supplied via the bore 154 flows away through the level-limiting opening 156 and combines with the cooling oil flow which is passing radially outward between the ring part 66 and the hub part 84. In the case of the piston 110, the pressure-application surfaces of the piston which are assigned to the pressure chamber 118 and to the pressure-compensation chamber 120 are of equal size and extend in the same radial region, so that corresponding level-limiting means are not required for the pressure-compensation chamber 120.

For the sake of completeness, it should also be noted that there are preferably further cooling oil flows during operation. For example, at least one radial bore 160 is provided in the transmission input shaft 24. A further partial cooling-oil stream, which is split into two partial streams, flows via the bore 160 as well as via an annular channel between the two transmission input shafts. One of the two streams flows radially outward between the two hub parts 80 and 84 (through the axial bearing 94) and the other of the two streams flows radially outward between that end region of the transmission input shaft 22 which is remote from the transmission and the hub part 80 and between this hub part 84 and the ring section 38 of the clutch hub 34 (through the bearings 98 and 100).

The basic structure of a multiple clutch arrangement, in the example illustrated a dual clutch arrangement, in which two clutch regions are provided by respective first and second multidisk clutch arrangements 64 and 72, has been described above. It should be noted that in principle a very wide range of variations may be made to this structure. A very wide range of variations may be selected in particular in the design and number of the individual disks in the disk assemblies.

As mentioned in the introduction, torsional vibration arrangements may be integrated in the various torque transmission paths of the dual clutch to compensate for the low torsional rigidity which is present in the output shafts 22, 24. As has already been explained above, a first torque transmission path passes from the clutch hub 34, via the metal carrier sheet 60 of the first multidisk clutch arrangement 64 and the inner disk carrier 82 of the first multidisk clutch arrangement 64, to the output shaft 22. The second torque transmission path leads onward from the metal carrier sheet 60 to the outer disk carrier 62 of the first multidisk clutch arrangement 64, through the ring part 66 and the outer disk carrier 70 of the second multidisk clutch arrangement 72 to the output shaft 24 via the disk assembly 74 and the inner disk carrier 86 of the second multidisk clutch arrangement 72.

In the exemplary embodiment in FIG. 1, a torsional vibration damper arrangement 200, 202 is integrated into each of these two torque transmission paths extending within the dual clutch arrangement 10, i.e. between the drive shaft 14 and the output shafts 22, 24. FIG. 1 shows that that the torsional vibration damper arrangement 200, 202 is in each case incorporated in the output-side region of the multidisk clutch arrangement 64 and 72, respectively. More specifically, each of the torsional vibration damper arrangement 200, 202 is integrated in the region of the individual inner disk carriers 82, 86, respectively. This is described below with reference to FIGS. 2–5.

Figure 2:
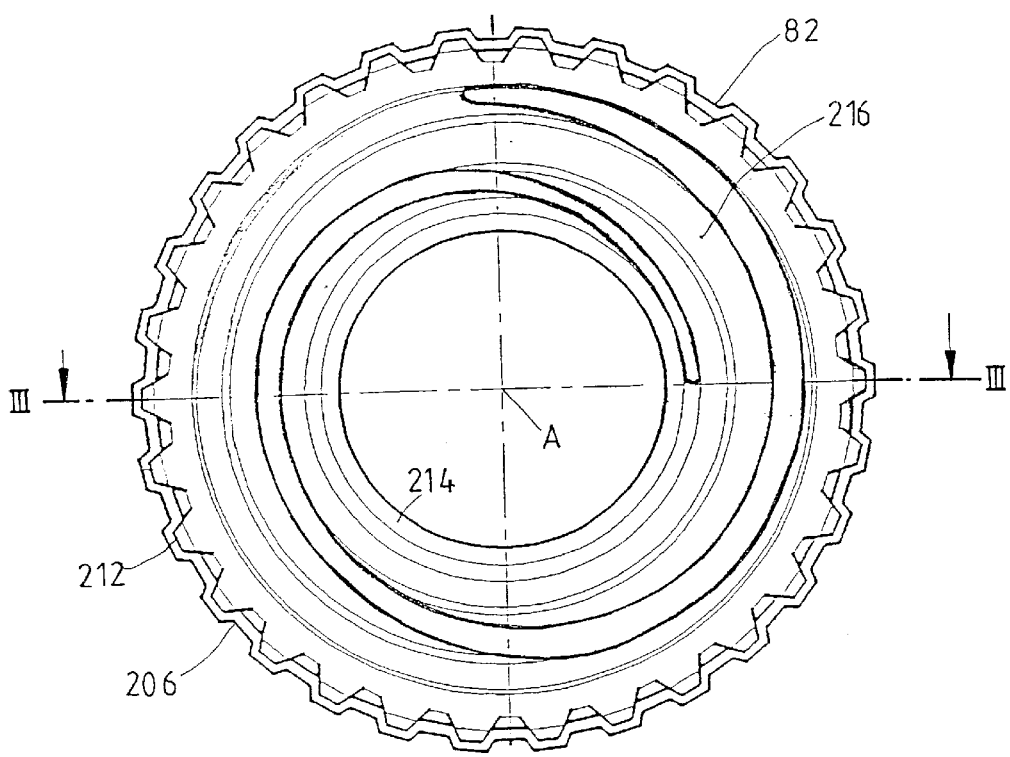
FIG. 2 is an axial view of a first disk carrier of the multiple clutch arrangement illustrated in FIG. 1.
Figure 3:
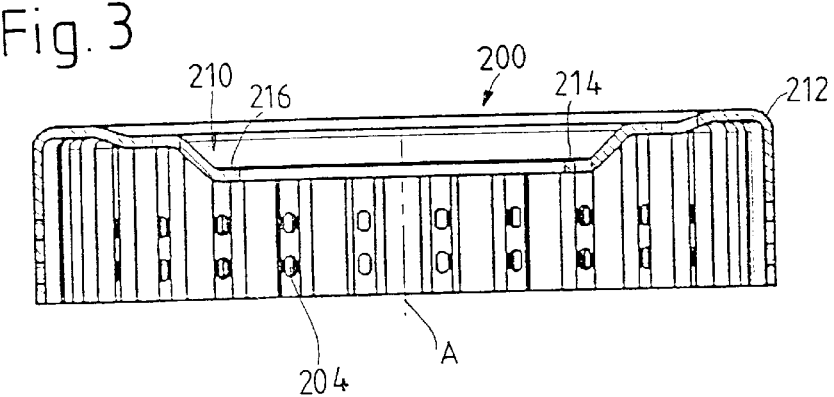
FIG. 3 is a sectional view of the first disk carrier along line III—III in FIG. 2.

FIG. 2 is an axial view of the inner disk carrier 82 for the radially outer disk assembly 76 of the first multidisk clutch arrangement 64. As can already be seen from FIG. 1, the inner disk carrier 82 is of pot-shaped design and may be formed, for example, by suitable stamping and forming of a sheet-metal blank. A toothing configuration or driving projection configuration 206, in which the inner disks 208 of the multidisk clutch arrangement 64 engage by a corresponding mating toothing, is provided in the substantially axially extending disk-carrying section 212. The inner disks 208 are in this way coupled to the inner disk carrier 82 such that they are fixed in terms of rotation and axially movable with respect to the inner disk carrier 82. The disk-carrying section 212 also has fluid passage openings 204 shown in FIG. 3. The inner disk carrier 82 includes a base region 210 which forms a connecting section. On the radially inner side of the base region 210, an annular part 214 is arranged which is substantially continuous in the circumferential direction and is fixed to the hub part 80, for example, by welding. A connecting region 216 designed as a helical arm is integrally attached between the disk-carrying section 212 and the annular part 214. The radially outer section of the connecting region 216 is integrally attached to the disk-carrying section 212 and the radially inner section of the connecting region 216 is integrally attached to the annular part 214. The annular part 214 comprises an inner coupling region and the disk-carrying section 212 comprises an outer coupling region. On account of the elasticity of the metal sheet material and also on account of the arrangement which is axially stepped in the region of this connecting region 216 (see FIG. 3), a circumferential elasticity is provided, thereby allowing the ring part 214 and the disk-carrying section 212 to rotate in the circumferential direction with respect to one another about the axis of rotation A when torsional loads occur. The torsional vibration damper 200 provided for the first multidisk clutch arrangement 64 is therefore substantially integrated into the inner disk carrier 82 and substantially comprises, as the radially outer coupling region, the disk-carrying section 212, as the radially inner coupling region the ring part 214, and the connecting region 216, which is substantially responsible for the damping function, on account of its elasticity.

Figure 4:
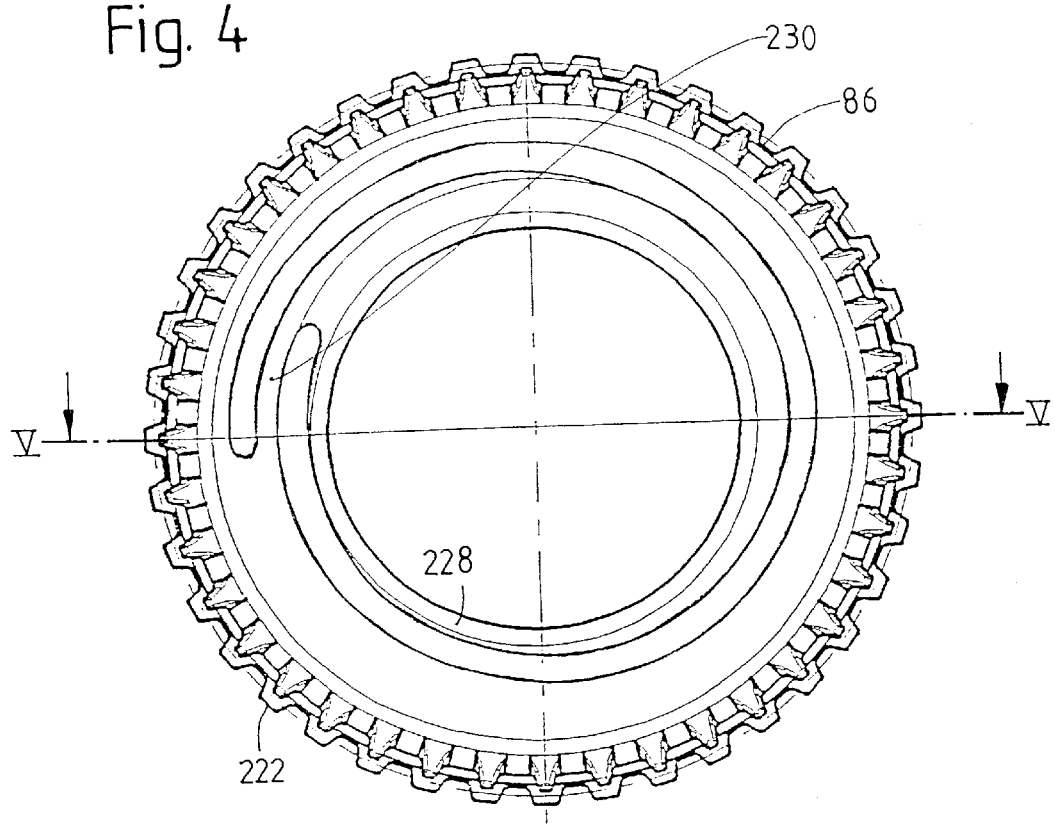
FIG. 4 is an axial view which corresponds to that shown in FIG. 2 of an internal disk carrier according to another embodiment of the present invention.
Figure 5:
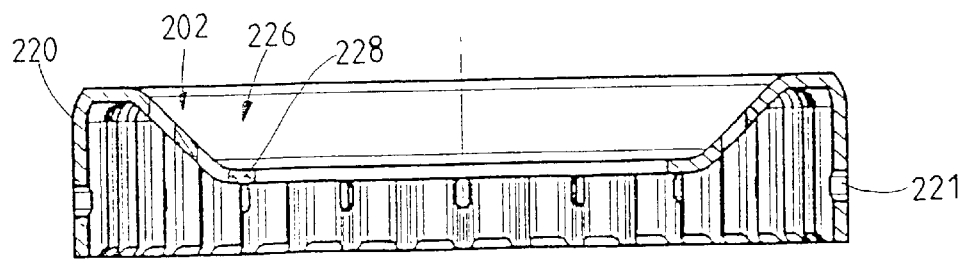
FIG. 5 is a sectional view of the second disk carrier along a line V—V in FIG. 4.

The inner disk carrier 86, which is shown in FIGS. 4 and 5, for the second multidisk clutch arrangement 72 is also designed in a corresponding way. The inner disk carrier 86 also has a pot-like structuring with a radially outer, substantially axially extending disk-carrying section 220 with fluid passage openings 221 therethrough and a toothing or driving arrangement 222 formed thereon. The individual inner disks 224 rest on this driving arrangement 222 by a corresponding mating driving arrangement, so that the inner disks 224 are fixed in terms of rotation and axially movable with respect to the inner disk carrier 86.

The inner disk carrier 86 also has a base region 226 designed with a radially inner continuous ring part 228, a connecting region 230 designed as a helical arm extending between the ring part 228 and the radially outer disk-carrying section 220. This connecting region 230 provides the necessary circumferential elasticity between the two disk-carrying region 220 and the ring part 228. Accordingly, the associated torsional vibration damper 202 is integrated into the inner disk carrier 86.

FIGS. 2–5 show that, in the embodiment of the dual clutch 10 shown in FIG. 1, a separate torsional vibration damper 200, 202 is integrated in each of the above-described torque transmission paths, i.e. after the branching of these torque transmission paths, as considered in the torque flux direction from the drive shaft 14, without requiring significant or additional space. As a result of the integration of these torsional vibration dampers as integral or single-part components of the corresponding inner disk carriers 82, 86, these components can perform a dual function. Moreover, the incorporation of the torsional vibration dampers 200 and 202, in engineering terms, only requires one further machining operation, namely a stamping operation during the production of the respective sheet-metal blank for the inner disk carriers 82 and 86.

It should be pointed out that, of course, it is also possible for a torsional vibration damper of this type to be integrated in only one of the torque transmission paths and then to be specifically adapted to the vibrations occurring in this path. In principle, the torsional vibration damper may also be integrated in an outer disk carrier.

Figure 6:
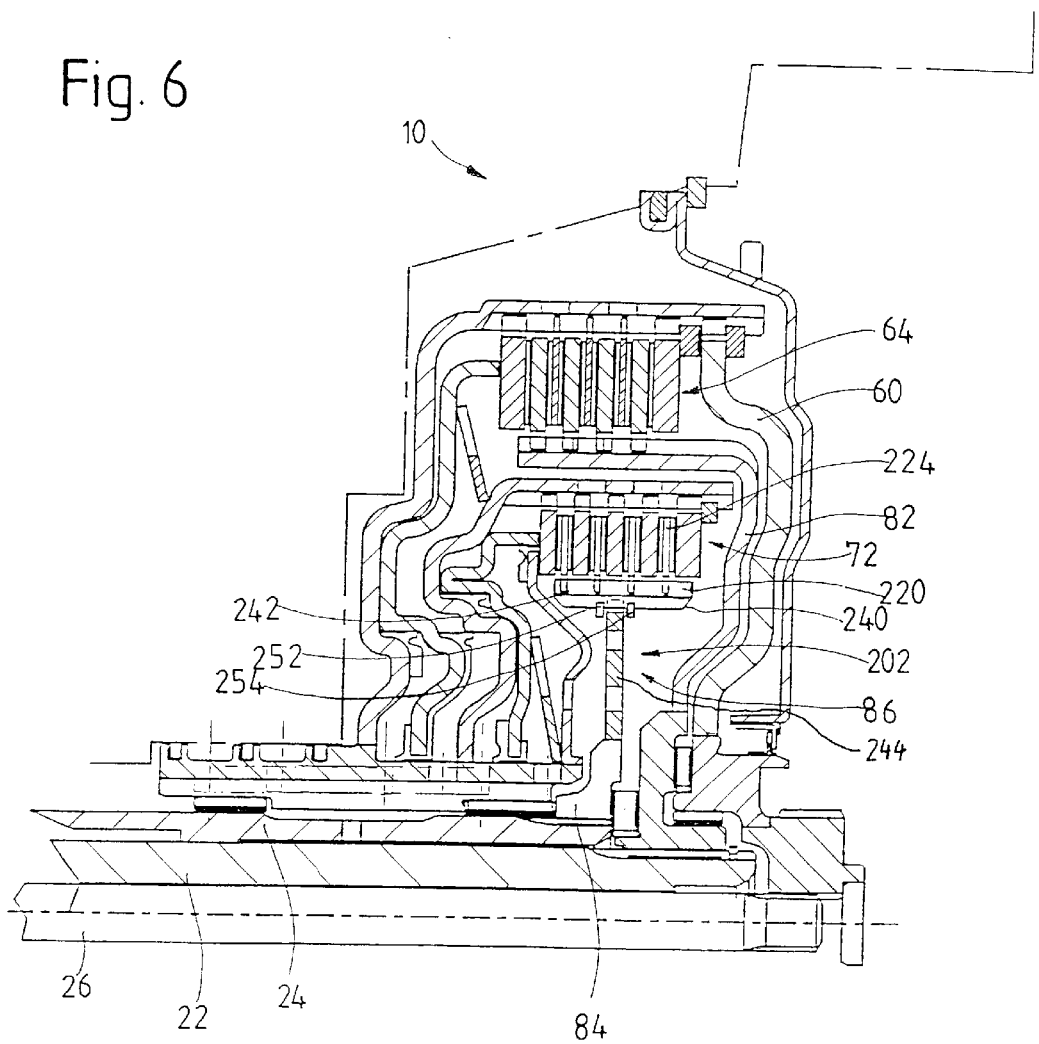
FIG. 6 is a partial longitudinal sectional view of a multiple clutch arrangement according to another embodiment of the present invention.
Figure 7:
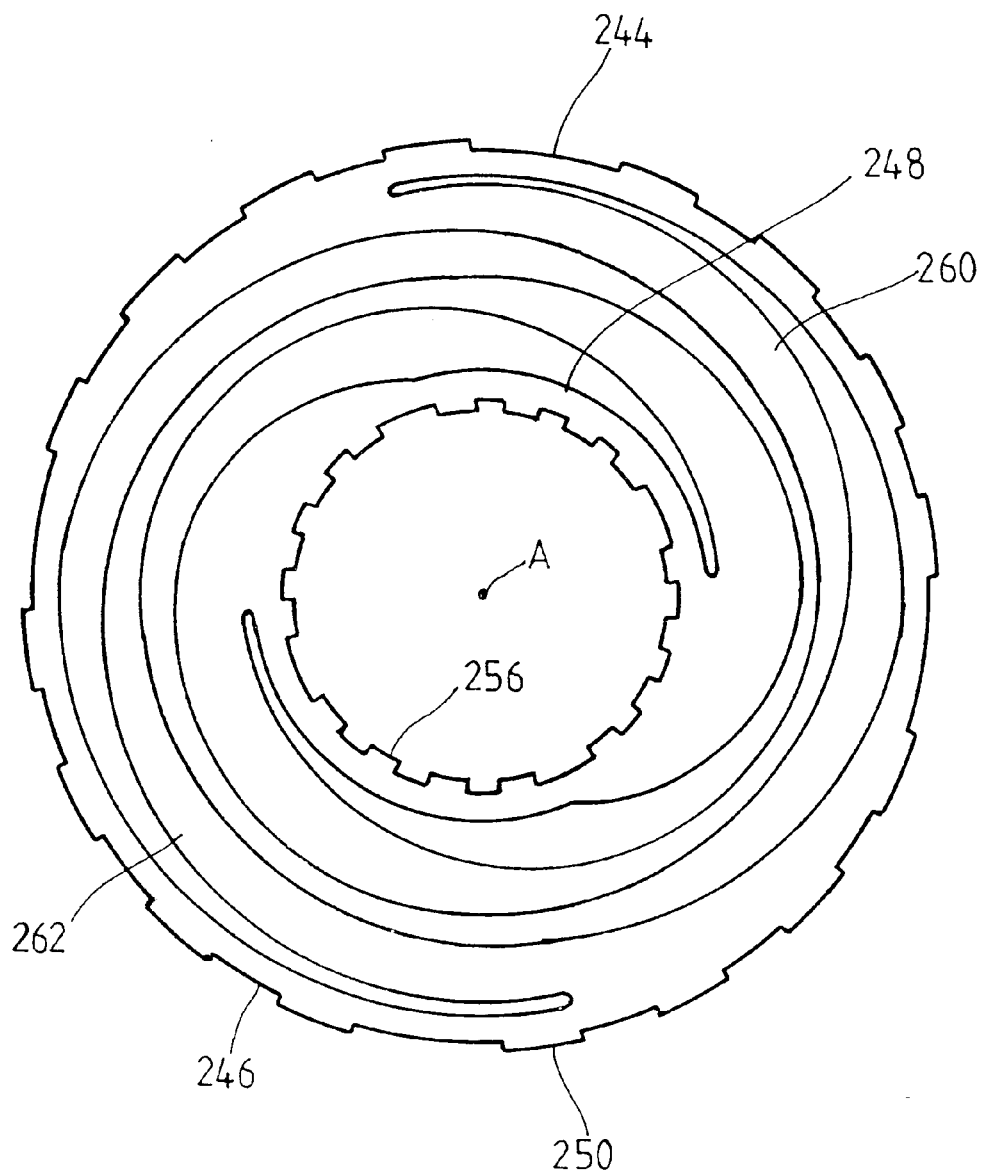
FIG. 7 is an axial view of a damper element used in the multiple clutch arrangement illustrated in FIG. 6.

A dual clutch with a further embodiment of a torsional vibration damper according to the present invention is shown in FIGS. 6 and 7. Since the significant difference between this embodiment and the embodiment shown in FIGS. 1–5 lies in the region of the torsional vibration damper 202 provided for the radially inner multidisk clutch arrangement 72, it is substantially only this difference which is described in the text which follows.

In the embodiment of FIG. 6, the inner disk carrier 86 is not designed as a single-part pot-shaped component. Rather, this inner disk carrier 86 comprises a substantially cylindrical, annular disk-carrying section 240. An outer circumferential side of the disk-carrying section 240 bears the toothing arrangement 222 for the inner disks 224. On an inner circumferential region, the disk-carrying section 240 has a further engagement or driving arrangement 242.

The torsional vibration damper 202 of this embodiment comprises at least one damper element 244. An axial view of the damper element 244, which is formed in a disk-like design, is shown in an axial view in FIG. 7. The damper element 244 has an annular, radially outer coupling region 246 and an annular, radially inner coupling region 248. The radially outer coupling region 246 has a toothing or driving arrangement 250 which may be brought into fixed rotational driving engagement with the toothing arrangement 242 on the inner circumferential region of the disk-carrying section 240. Securing rings 252 and 254 may be arranged on the disk-carrying section 220 on both sides of the damper element 244 for axially securing the disk-carrying section 220 relative to the damper element 244.

The radially inner, annular coupling region 248 also has a toothing or driving formation 256, which may be brought into driving engagement with a corresponding formation of the hub region 84. Alternatively, the radially inner annular coupling region 248 may be fixed to the hub region 84 by welding or other fixed connection.

Two connecting regions 260, 262 designed as helical arms extend between the the radially outer and radially inner coupling regions 246, 248. The connecting regions 260, 262 are arranged substantially symmetrically with respect to one another with regard to the axis of rotation A. The circumferential elasticity and the curved contour of the connecting regions 260, 262 allow a relative rotational movement between the radially outer coupling region 246 and the radially inner coupling region 248.

The disk-like damper element 244 may be stamped out of a sheet-metal blank. However, because the damper element 244 is a separate element, the damper element may also be formed from a different material from the disk-carrying section 240. As with the torsional vibration dampers described above, the shaping or number of connecting regions allows adaptation to the expected torsional vibration excitation in the particular torque path in which the damper is to be arranged. The thickness of the sheet-metal materials used also has a considerable influence on the damping characteristic.

The embodiment of FIGS. 6 and 7 also allows the use of a plurality of damper elements 244 in one torque path, wherein the plural damper elements are arranged in staggered form bearing axially against one another. These plural damper elements then act in parallel, i.e. their respective outer coupling region 246 is attached in a rotationally fixed manner to the disk-carrying section 240, and their respective radially inner coupling region 248 is coupled in a rotationally fixed manner to the hub region 84. However, it is also possible to arranged at least two damper elements 244 to act in series. For this purpose, a radially outer coupling region 246 of one of the damper elements 244 may be attached to the disk-carrying section 240, the radially inner coupling region 248 of this damper element 244 may be attached to the radially inner coupling region 248 of a further damper element 244, and the radially outer coupling region 248 of this further damper element 244 may either be fixedly coupled, via a connecting plate, to the hub region 84 or may be attached, via a further damper element 244 of this type, to the hub region 84. In this case, the radially outer coupling region 246 of this third damper element is attached to the radially outer coupling region 246 of the second damper element 244, and the radially inner coupling region 248 of the third damper element 244 is then fixedly attached to the hub region 84. When using a plurality of damper elements which act in parallel, only one of the damper elements may be directly attached to the disk-carrying section 240 via its radially outer coupling region and only one of the damper elements may be directly attached to the hub region 84 via its radially inner coupling region. The respective coupling regions of the other damper elements may be fixedly connected to the associated coupling regions of the one damper element directly connected to the disk-carrying section 240 and the hub region 84. Each of the plurality of damper elements may be prepared from different materials or with different damping characteristics of their respective connecting regions. Spring steel material has proven to be particularly advantageous material. The wide variety of possible uses or variations of damper elements are extensively described in U.S. patent application Ser. No. 09/827,402, filed on Apr. 5, 2001. The content of disclosure of U.S. patent application Ser. No. 09/827,402 is hereby incorporated by reference in the content of the disclosure of the present application.

Although, in the embodiment of the dual clutch 10 according to the invention illustrated in FIG. 6, a torsional vibration damper arrangement 202 is illustrated only in the region of the second multidisk clutch arrangement 72, the first multidisk clutch arrangement 64 may also be assigned a torsional vibration damper of this nature, for example once again in the form of the torsional vibration damper 200 illustrated in FIG. 1, or likewise in the form of a torsional vibration damper which is provided with at least one separately formed damper element. This, like the base region 210 of the inner disk carrier illustrated in FIG. 3, could be axially molded out in order to be adapted to the metal carrier sheet 60. Ultimately, therefore, any of the first and second multidisk clutch arrangements 64, 72 may include any of the above-described embodiments of the associated torsional vibration damper.

As a result of the incorporation of the above-described torsional vibration dampers in the various torque transmission paths, it is possible, as mentioned above, to have a direct influence on the output-side rigidity of the drive train. It is therefore possible to reduce the overall rigidity. When a gear has been engaged, the natural frequencies in these regions are shifted toward lower torques. In the ideal scenario, the natural frequencies are shifted out of the torque range which occurs in the driving range. Furthermore, it is additionally possible to provide friction devices in the torsional vibration dampers according to the present invention which may also act on a torque-selective basis to prevent or increase the resistance to the relative movement of the regions which are displaced relative to one another in the circumferential direction and therefore to shift the natural frequency further upward in these torque ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A multiple clutch arrangement, comprising:

a drive member rotatable about an axis of rotation;

first and second output members rotatable relative to each other about the axis of rotation;

a first clutch arrangement connected between said drive member and said first output member for selectively activating a first torque transmission path between said drive member and said first output member;

a second clutch arrangement connected between said drive member and said second output member for selectively activating a second torque transmission path between said drive member and said second output member, wherein at least one of said first and second clutch arrangements comprises a multidisk clutch arrangement comprising a plurality of drive disks coupled to said drive member for common rotation therewith, a plurality of output disks coupled to the one of the first and second output members associated with said at least one of said first and second clutch arrangements for common rotation therewith, an input disk-carrier region for holding said plural drive disks, and an output disk-carrier region for holding said plural output disks; and a torsional vibration damper arranged in said output disk-carrier region of said at least one of said first and second clutch arrangements in the associated one of said first and second torque transmission paths.

2. The multiple clutch arrangement of claim 1, further comprising a torsional vibration damper arranged in each of said first and second clutch arrangements in said first and second torque transmission paths.

3. The multiple clutch arrangement of claim 1, wherein each of said first and second clutch arrangements comprises an input-side region and an output-side region with respect to a torque flux direction from said drive member to said first and second output members and said torsional vibration damper arrangement is arranged in the output-side region of said at least one of said first and second clutch arrangements.

4. A multiple clutch arrangement comprising:

a drive member rotatable about an axis of rotation, first and second output members rotatable relative to each other about the axis of rotation;

a first clutch arrangement connected between said drive member and said first output member for selectively activating a first torque transmission path between said drive member and said first output member;

a second clutch arrangement connected between said drive member and said second output member for selectively activating a second torque transmission path between said drive member and said second output member, wherein at least one of said first and second clutch arrangements comprises a multidisk clutch arrangement comprising a plurality of drive disks coupled to said drive member for common rotation therewith, a plurality of output disks coupled to the one of the first and second output members associated with said at least one of said first and second clutch arrangements for common rotation therewith, an input disk-carrier region for holding said plural drive disks, and an output disk-carrier region for holding said plural output disks; and a torsional vibration damper arranged in one of said input disk-carrier region and said output disk-carrier region of said at least one of said first and second clutch arrangements in the associated one of said first and second torque transmission paths, wherein said one of said input disk-carrier region and said output disk-carrier region comprises a disk-carrying section for carrying at least one disk and a connecting section, wherein said torsional vibration damper arrangement is integrated into said connecting section.

5. The multiple clutch arrangement of claim 4, wherein said torsional vibration damper arrangement comprises at least one damper element having a radially outer coupling region, a radially inner coupling region, and at least one deformation region extending between said radially outer coupling region and said radially inner coupling region, said at least one deformation region being deformable for allowing a relative circumferential movement between said radially outer coupling region and said radially inner coupling region.

6. The multiple clutch arrangement of claim 5, wherein at least a portion of said at least one deformation region extends in a circumferential direction between said radially outer coupling region and said radially inner coupling region.

7. The multiple clutch arrangement of claim 6, wherein said at least a portion of said at least one deformation region extends helically with respect to the axis of rotation.

8. The multiple clutch arrangement of claim 5, wherein said at least one damper element comprises at least two deformation regions.

9. The multiple clutch arrangement of claim 5, wherein at least one of said radially inner coupling region and said radially outer coupling region of said at least one damper element comprises an annular design.

10. The multiple clutch arrangement of claim 5, wherein said radially outer coupling region is formed as an integral part with said disk-carrying section.

11. The multiple clutch arrangement of claim 10, wherein said disk-carrying section is arranged as part of said torsional vibration damper arrangement.

12. The multiple clutch arrangement of claim 5, wherein said radially outer coupling region is formed as a separate part from said disk-carrying section and is fixed thereto with respect to rotation.

13. The multiple clutch arrangement of claim 5, wherein said torsional vibration damper arrangement in said at least one of said first and second clutch arrangements comprises an integral unit including said radially outer coupling region, said radially inner coupling region and said at least one connecting region.

14. The multiple clutch arrangement of claim 13, wherein said integral unit of said torsional vibration damper arrangement comprises a stamped and sheet-metal part.

* * * * *